US010635682B2

(12) United States Patent
Parthasarathy et al.

(10) Patent No.: US 10,635,682 B2
(45) Date of Patent: Apr. 28, 2020

(54) LOG SUMMARIZATION AND DIFF

(71) Applicant: Microsoft Technology Licensing, LLC, Redmond, WA (US)

(72) Inventors: Srivatsan Parthasarathy, Seattle, WA (US); Rohit Bhardwaj, Redmond, WA (US); Chirag Gupta, Sammamish, WA (US); Vipul Malhotra, Kirkland, WA (US); Evan Herschel Brodie Hissey, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 370 days.

(21) Appl. No.: 15/130,651

(22) Filed: Apr. 15, 2016

(65) Prior Publication Data

US 2017/0169080 A1  Jun. 15, 2017

Related U.S. Application Data

(60) Provisional application No. 62/267,805, filed on Dec. 15, 2015.

(51) Int. Cl.
*G06F 17/30* (2006.01)
*G06F 16/248* (2019.01)
(Continued)

(52) U.S. Cl.
CPC .......... *G06F 16/248* (2019.01); *G06F 3/0482* (2013.01); *G06F 3/04842* (2013.01);
(Continued)

(58) Field of Classification Search
CPC ......... G06F 17/30554; G06F 17/30368; G06F 17/30536; G06F 17/30719; G06F 17/40;
(Continued)

(56) References Cited

U.S. PATENT DOCUMENTS 6,314,386 B1   11/2001 Uemura
6,925,476 B1   8/2005 Multer et al.
(Continued)

FOREIGN PATENT DOCUMENTS

WO   2015065388 A1   5/2015

OTHER PUBLICATIONS

International Search Report and the Written Opinion issued in PCT application No. PCT/US2016/065470 dated Mar. 13, 2017.
(Continued)

*Primary Examiner* — Huawen A Peng
(74) *Attorney, Agent, or Firm* — Workman Nydegger

(57) ABSTRACT

Analyzing log data. The method includes obtaining a first bucket of a log data. The first bucket of log data includes a plurality of log lines. The method further includes analyzing the first bucket of log data to identify different sets of similar log lines. The method further includes providing to a user in a user interface one or more summaries of the different sets of similar lines. The summary comprises at least one user selectable indicator representing differences in log lines in a set of similar log lines that when selected by a user in the user interface reveals specific differences in the log lines in the set of similar log lines.

22 Claims, 8 Drawing Sheets

(51) Int. Cl.
  *G06F 16/23*    (2019.01)
  *G06F 16/2458*  (2019.01)
  *G06F 17/40*    (2006.01)
  *G06F 11/32*    (2006.01)
  *G06F 16/34*    (2019.01)
  *G06F 16/26*    (2019.01)
  *G06F 3/0482*   (2013.01)
  *G06F 3/0484*   (2013.01)
  *G06F 11/34*    (2006.01)

(52) U.S. Cl.
  CPC ........ *G06F 11/323* (2013.01); *G06F 16/2358* (2019.01); *G06F 16/2462* (2019.01); *G06F 16/26* (2019.01); *G06F 16/345* (2019.01); *G06F 17/40* (2013.01); *G06F 11/3476* (2013.01)

(58) Field of Classification Search
  CPC .. G06F 11/323; G06F 3/0482; G06F 3/04842; G06F 16/248; G06F 16/26; G06F 16/2358; G06F 16/2462; G06F 16/345; G06Q 10/00
  See application file for complete search history.

(56) References Cited

U.S. PATENT DOCUMENTS

| | | | |
|---|---|---|---|
| 8,453,027 | B2 | 5/2013 | Bartz et al. |
| 8,671,097 | B2 | 3/2014 | Wu et al. |
| 10,360,184 | B2* | 7/2019 | Jerrard-Dunne .... G06F 16/1748 |
| 2003/0131286 | A1 | 7/2003 | Kaler et al. |
| 2004/0250169 | A1 | 12/2004 | Takemori et al. |
| 2009/0276469 | A1 | 11/2009 | Agrawal et al. |
| 2011/0227925 | A1 | 9/2011 | Pauw et al. |
| 2013/0318604 | A1 | 11/2013 | Coates et al. |
| 2014/0334739 | A1 | 11/2014 | Umanesan |
| 2015/0066814 | A1 | 3/2015 | Allen et al. |
| 2016/0299934 | A1* | 10/2016 | Karandikar ......... G06F 16/2358 |

OTHER PUBLICATIONS

Suneetha, et al., "Identifying User Behavior by Analyzing Web Server Access Log File", In International Journal of Computer Science and Network Security, vol. 9, Issue 4, Apr. 2009, pp. 327-332.

* cited by examiner

Data based on last 7 days 1 bar = 6 hrs

21:28:00 GMT  09:28:00 GMT  21:28:00 GMT
Nov. 17, 2015  Nov. 20, 2015  Nov. 22, 2015

Type = Event 18,025 Results   1 Type   6 Computer   ~Minify

SELECT FIELD   RenderedDescription ∨

8 event groups found in top 1000 events 70 matches   See More
<Param>NEB-OM-963801 MG</Param>micro_SystemCenter.CollectPerformanceDataToCloud_PerfP</Param>

14 matches   See More
<DataItem types [*] [*] "SystemXmData'times 2019843980932 sourcehealthServices"afd09k-0968lksf-schemes 14 matches   See More
DiscoverHealthServicesCommunicationRelationships: HealthServiceCommunication relationship discovery for services 3 matches   See More
The health service HTTP module exceeded number of attempts to post data URL [*] Dropping data batch — 104

1 matches   See More
DMS resolution of the server name 15b1d09f00045xlf-0987 failed. Please check that computer has internet access 1 matches   See More
A module of type MicoEnterpriseManagementHealthService reported an exception System Except unable to register 1 matches   See More
Failed to import the latest advisor Management packs to the management server. Requested Management is invalid +Add

*Figure 1D*

LOG SUMMARIZATION AND DIFF

CROSS-REFERENCE TO RELATED APPLICATIONS

This application claims the benefit of and priority to U.S. Provisional Patent Application Ser. No. 62/267,805 filed on Dec. 15, 2015 and entitled "Log Summarization and Diff," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc. Computer systems often implement logging functionality. Logs can record computing events, such as operations performed, errors detected, messages received, etc. Logs could additionally or alternatively record information about transactions (which are atomic sets of operations that must either all be performed or all be rolled back so as to have no overall effect). For example, a transaction log could record all transactions that have been committed and/or aborted.

Logs are increasingly becoming the basis for developers, DevOps teams and IT pros to use as the basis of operational analytics. Developers have created logs traditionally to serve their own needs as a telemetry and diagnostic aid. It has been difficult for others, such as IT pros, to make sense of them and use logs effectively for operations. Due to the rapid cadence of software development and release in the context of cloud computing, developers have not had the bandwidth to additionally invest in other simpler forms of operational data to help IT pros. Even in DevOps teams the logs are hard to use for quick triaging of a live site issue by tier 1 or 2 service engineers. Tools that enable text search over logs return too many raw results for a user to handle, and facets while very helpful in representing the distribution of results across those dimensions, do not work.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for analyzing log data. The method includes obtaining a first bucket of a log data. The first bucket of log data includes a plurality of log lines. The method further includes analyzing the first bucket of log data to identify different sets of similar log lines. The method further includes providing to a user in a user interface one or more summaries of the different sets of similar lines. The summary comprises at least one user selectable indicator representing differences in log lines in a set of similar log lines that when selected by a user in the user interface reveals specific differences in the log lines in the set of similar log lines.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1D illustrates summarized log data including one or more user selectable elements for expanding log summarization data;

DETAILED DESCRIPTION

Embodiments herein can help facilitate examination of log data by collecting a so called 'bucket' of log data, analyzing the log data in the bucket of log data to identify similar log lines, summarizing the log data by grouping similar log lines into sets of similar lines, and providing a user a summary of the different sets of similar lines.

In some embodiments, different buckets can be compared with each other. For example, one bucket of log data may be captured for a first time, summarized and compared with a second bucket of log data captured and summarized for a second time. Embodiments may compare and contrast similar sets from the buckets. For example, if a set from the second bucket grows as compared to a comparable set from the first bucket, this change can be highlighted to the user. Similarly, if a set from the second bucket shrinks as compared to a comparable set from the first bucket, this change can be highlighted to the user. Sets that are unique to the first bucket or the second bucket can be identified and highlighted to a user.

Figure 1A:
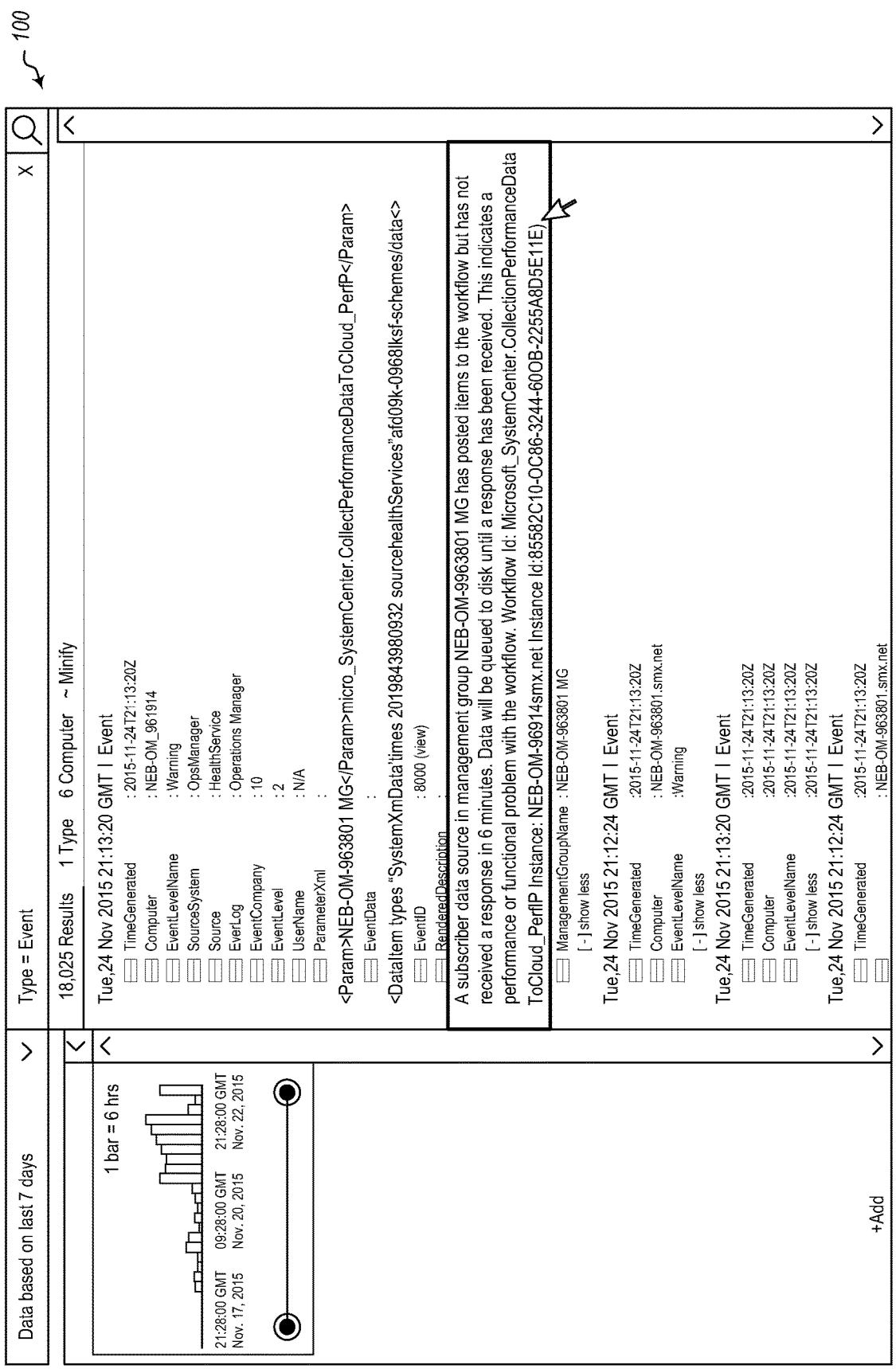
FIG. 1A illustrates a user interface for summarizing log data.
Figure 1B:
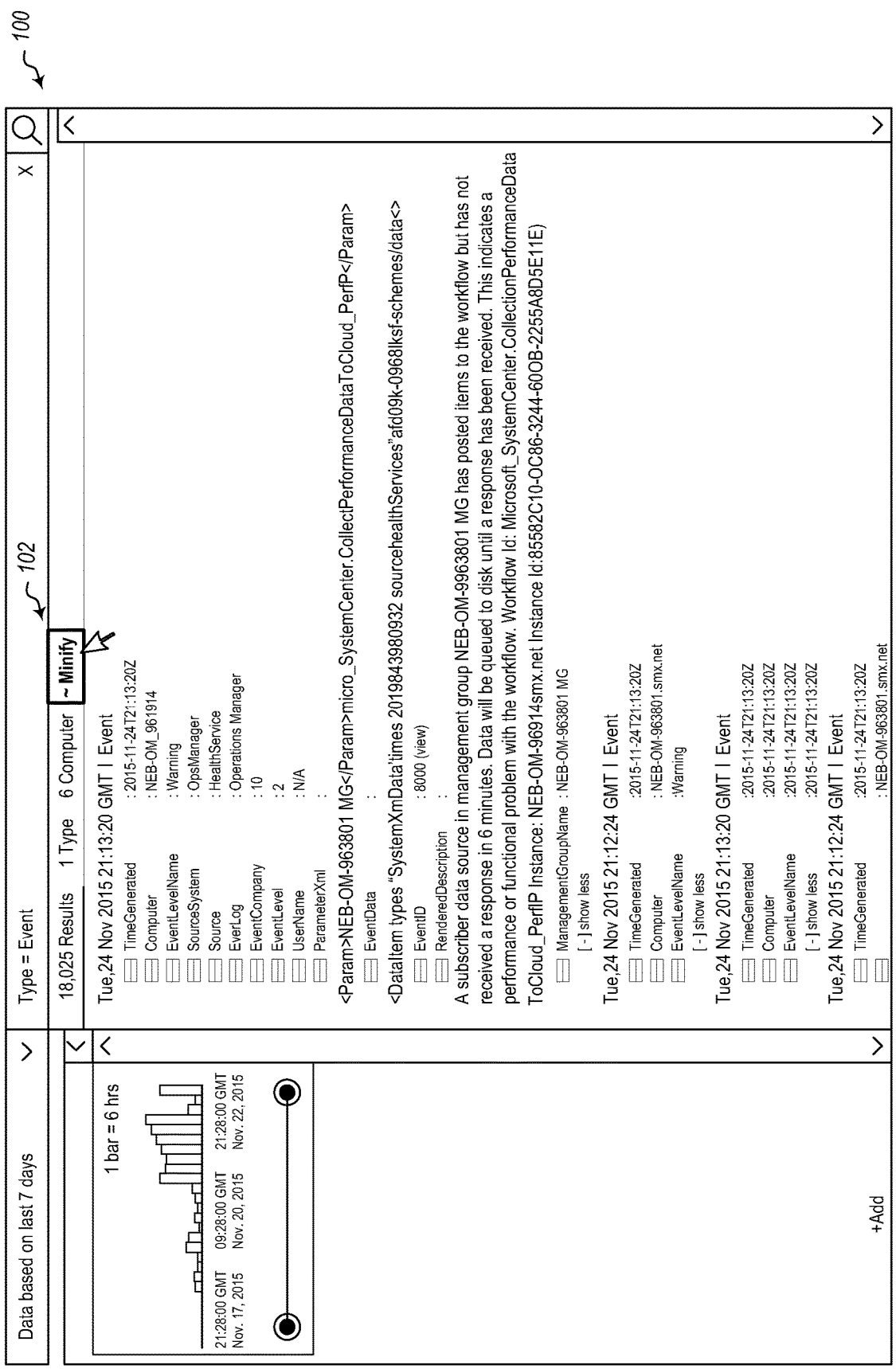
FIG. 1B illustrates a user interface and user interface elements for navigating to summarized log data.
Figure 1C:
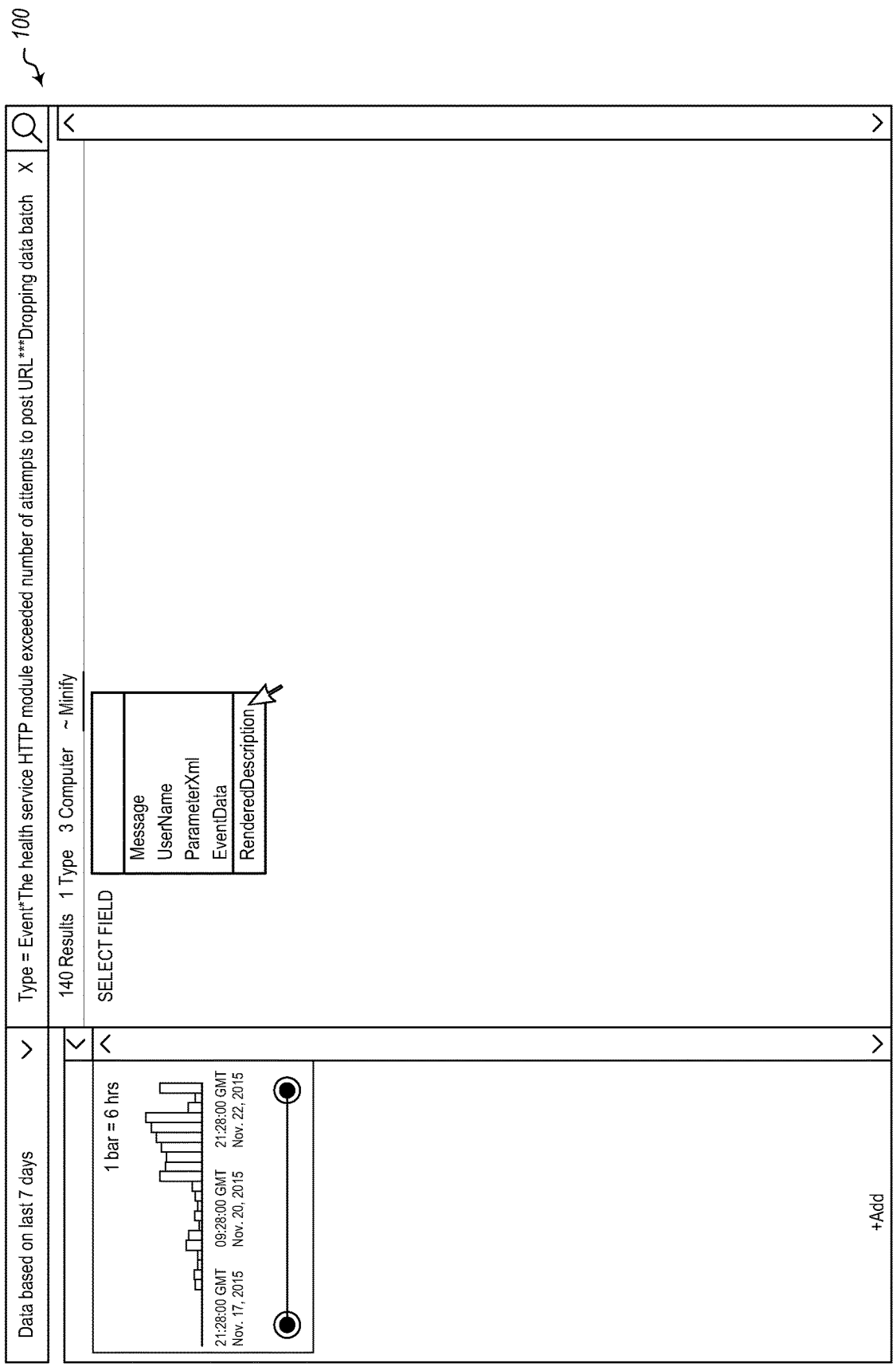
FIG. 1C illustrates user interface elements for selecting log summarization data.

Referring now to FIGS. 1A-1E, an example is illustrated showing a user interface 100 that presents summarized results to a user. FIG. 1A illustrates a user interface 100 showing various log lines. As illustrated in FIG. 1B, a user can select a user interface element 102 indicating a user's desire to view summarized data, which in the illustrated example, is a link. Selecting the user interface element 102 causes the view of the user interface 100 illustrated in FIG. 1C to be displayed. Here, a user can select a field to summarize on. In the illustrated example, the user selects the rendered description as the field to summarize log lines on. Selecting this field, causes the view of the user interface 100 illustrated in FIG. 1D to be displayed.

In the particular example illustrated in FIG. 1D, 1000 log lines are summarized into eight different groups, based on the rendered descriptions. In this example, log lines that are sufficiently similar are grouped into the same group.

Figure 1E:
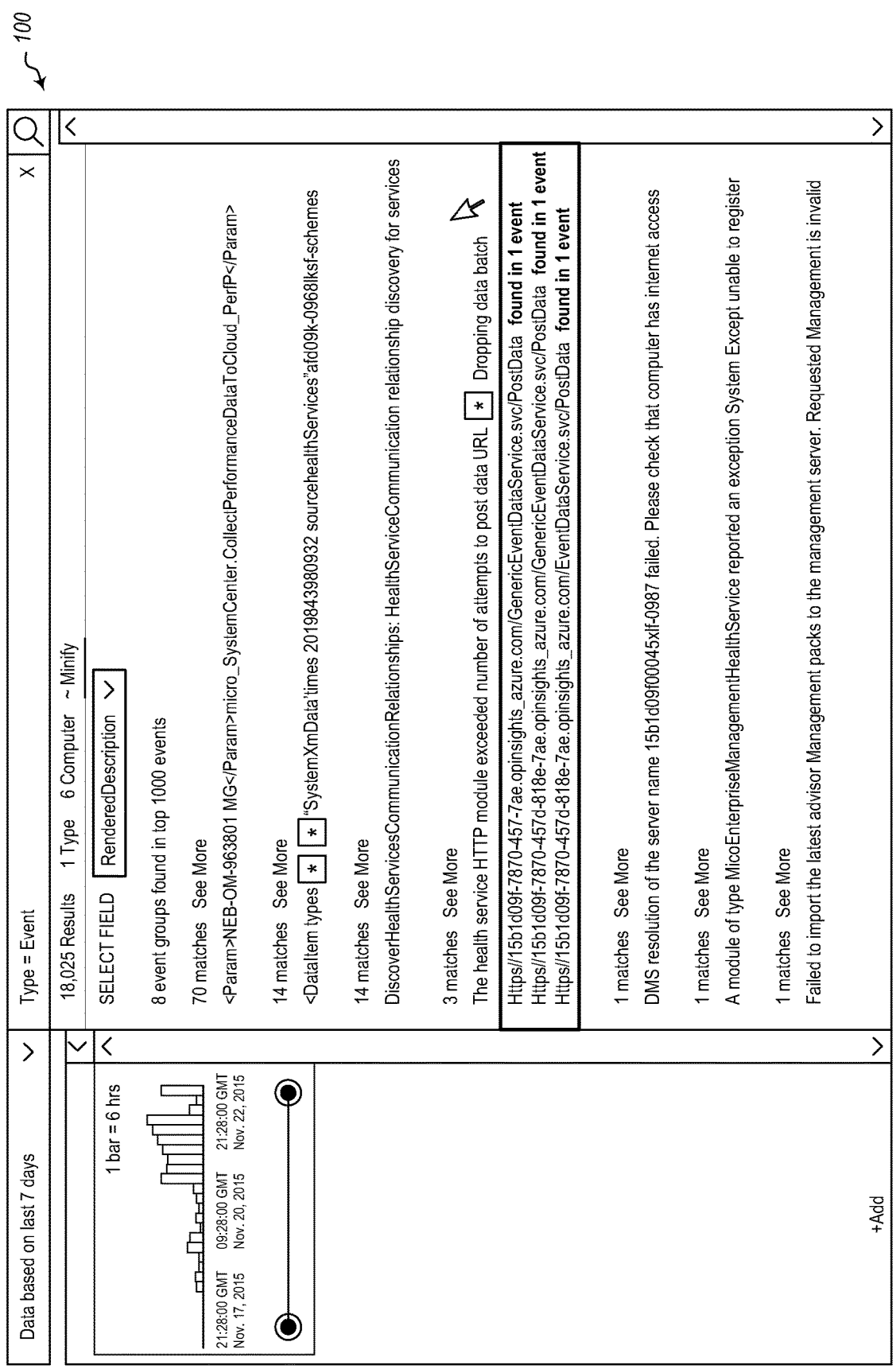
FIG. 1E illustrates summarized log data including data expanded to show additional summarized log data.

If a user sees a set of log lines that are of interest, the user can drill down into the set of log lines to identify all of the details of all of the log lines for a group. In FIG. 1D, the portions of the log lines that are the same in a particular set are shown, while differing portions of log lines in a set are indicated by a user interface element 104, which in this case is an asterisk. FIG. 1D illustrates that a user can select an asterisk (or other appropriate user interface element). Selecting the asterisk in the present example, will cause the user interface 100 to appear as shown in FIG. 1E. FIG. 1E illustrates that the set is expanded to show what the asterisk represents in the three log line instance occurring the illustrated group.

Note that embodiments may also include the ability to compare different buckets of log lines. In the example illustrated, each different bucket has sets of log lines as illustrated above. When comparing two buckets of log lines, some of the sets may exist in both buckets, while some sets only occur in one bucket or the other.

Figure 2:
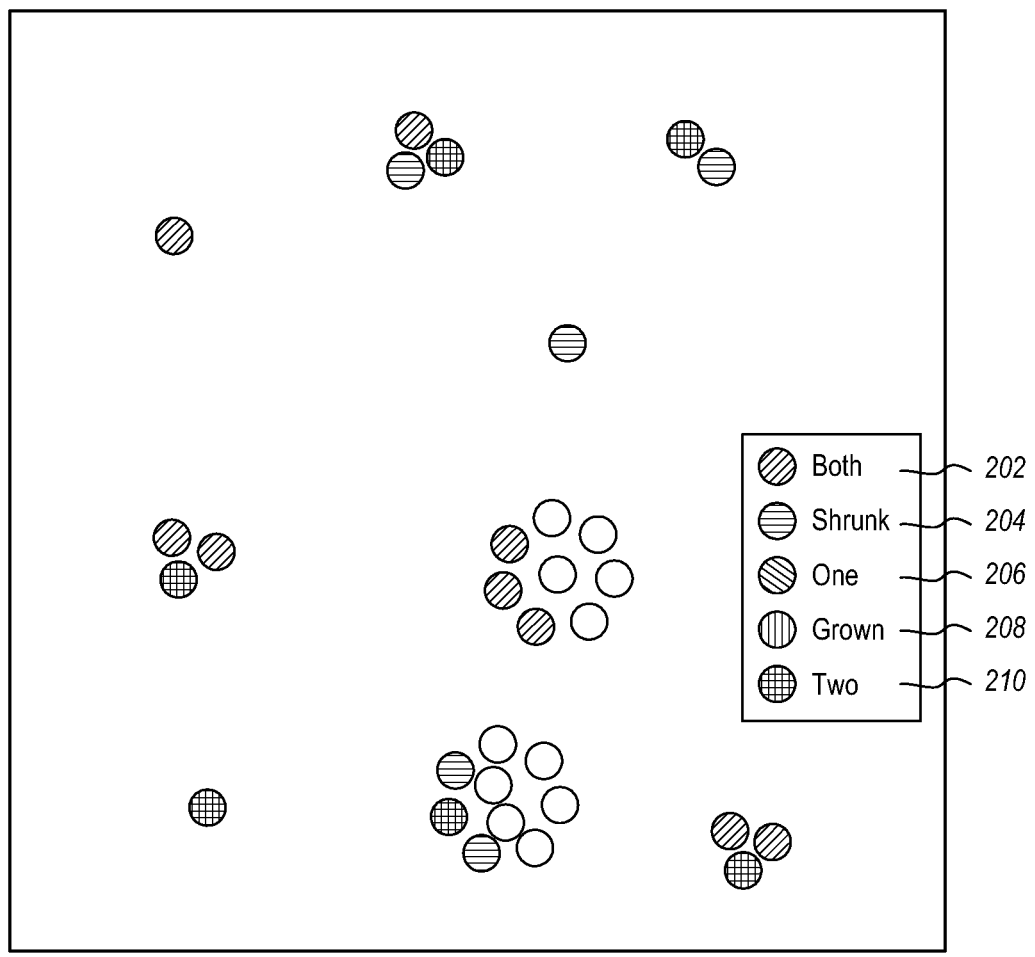
FIG. 2 illustrates a graphical comparison of different collections of log data.
Figure 3:
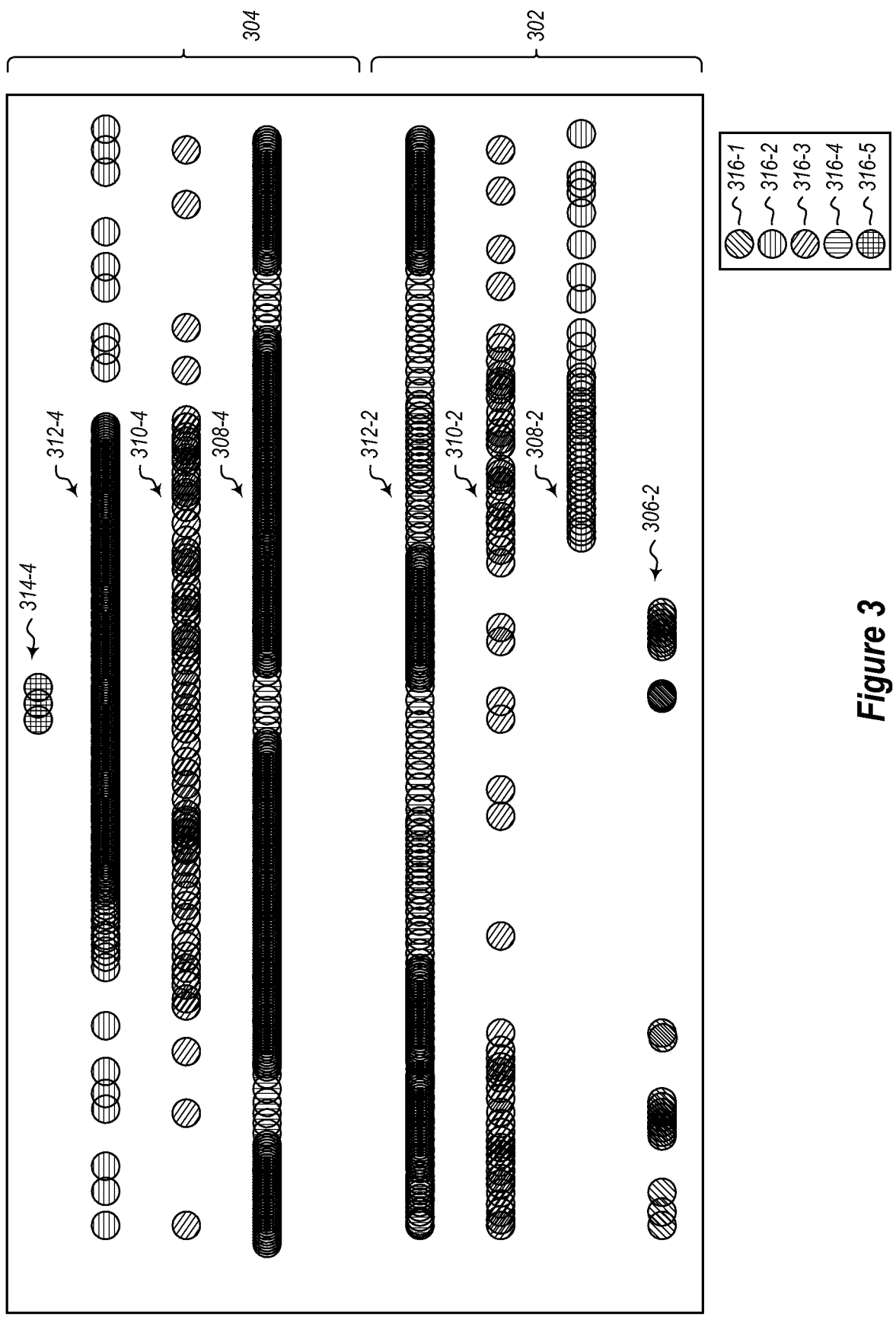
FIG. 3 illustrates an alternative graphical comparison of different collections of log data.

FIGS. 2 and 3 illustrate two user interface representations that may be used to provide a comparison of two different buckets of log lines. In FIG. 2, log lines are shown in clusters with each set shown as a dot. The shading of the dots 206 indicate comparative aspects. Dots shaded according to shading 202 indicate that a set occurred in both the first bucket and the second bucket. Dots shaded according to shading 204 indicate that a set occurred in both buckets, but that the set shrunk in size from the first bucket to the second bucket. Dots shaded according to the shading 206 indicates that a set only occurred in the first bucket. Dots shaded according to the shading 208 indicates that a set occurred in both buckets, but that the set grew (i.e., had more members) in the second bucket. And dots shaded according to the shading 210 indicates that a set only occurred in the second bucket. Of course this is only an example, and other embodiments may use other representations to indicate to a user various comparative aspects of the different buckets. FIG. 3 illustrates an example where in a user interface, circles represent individual log lines. The position of a circle on the y-axis identifies a group to which the log line belongs. The x-axis may represent increasing time or log line designators.

The example illustrated in FIG. 3 all also illustrates a set of two windows 302 and 304. Sets of log lines can be shaded, or otherwise highlighted, to illustrate differences between similar groups of log lines. In this example, the first window 302 and second window 304 are compared. The first window includes a set 306-2 that only occurs in the first window 302. The set is shaded with the shading 316-1 to illustrate that the set only occurs in the first window 302.

An instance 308-2 of a set occurs in the first window 302 and the corresponding instance 308-4 of the set occurs in the second window 304. One can see that the set is larger in the second window 304 as compared to the first window 302 and is smaller in the first windows 302 as compared to the second window 304 by inspecting the two instances of the set. However, embodiments may also provide shading or other highlighting to highlight the changes between the two windows 302 and 304. For example, the shading 316-2 indicates that the instance 308-2 of the set is smaller than a comparative instance 308-4 of the set. The shading 316-5 indicates that the instance of 308-4 of the set is larger than the instance 308-2 of the set.

An instance 310-2 of a set also occurs in the first window 302 and the corresponding instance 310-4 of the set occurs in the second window 304. One can see that the set is similar in magnitude, but distributed differently between the windows. The shading 316-3 can be provided as an indicator showing that the two instances 310-2 and 310-4 are similar in size within some predetermined threshold. For example, embodiments may determine a percentage similarity. So long as the instances are within some given percentage, e.g., 10%, then the instances with the highlighted with a similar highlighting such as the shading 316-4 illustrated in FIG. 3.

An instance 312-2 of a set also occurs in the first window 302 and the corresponding instance 312-4 of the set occurs in the second window 304. One can see that the instance 312-2 is larger than the instance of 312-4 indicating that the set shrunk from the first window 302 to the second window 304 or alternatively the set grew from the second window 304 to the first window 302 depending on what the windows represent. Thus, as illustrated, because the instance 312-2 is larger than the instance of 312-4, it is shaded with the shading 316-4. Complimentarily, because the set 312-4 is smaller than the set 312-2, the set 312-4 is shaded with the shading 316-2.

The second window includes a set 314-4 that only occurs in the second window 304. Because there is no corresponding set to the set 314-4 in the first window 302, the set 314-4 is shaded with the shading 316-5.

Illustrating now additional details, a time sensitive troubleshooting/root cause diagnosis scenario common to both IT Pros and DevOps is when they find their site/application which was functioning just fine previously is down now and they need to quickly find out why, so they can fix the problem and bring it back up. Embodiments presented herein can be used to allow users to simply specify two windows of time, one where the application was working and another where it is not and for the system to quickly highlight a summary of differences in logs across these windows to help identify a root cause the issue.

Embodiments may employ a technique of log clustering that can aid summarization of logs over a given time window (or other window) when an issue has occurred. This summarization can be differentiated from a different baseline time window (or other window) when there was no issue. Embodiments can summarize, for example, the most significant differences to focus on, the distribution of data (auto-facets) on these log clusters that matter, and a possible time when the problem started. With the log metadata information, including the source component that generated each log record and a dependency layer map of components in the stack, the component which is the root cause of the problem may be able to be identified. Embodiments may be implemented where the data is summarized in a format that allows visualization tools to represent this data in many meaningful ways by the customer, such as time series representations of the clusters which have significantly grown or shrunk across the windows as well as those that occur uniquely in either window.

One embodiment illustrated herein summarizes log lines in a given window as follows, processing each incoming record in a given window one record at a time (e.g., in a streaming algorithm):

1. Vectorization: Convert each log record to a vector representation

A. Embodiments have a dynamically tuned 'token count window' based on the number of tokens in the record. For example, assume embodiments use a token window length of 2 (bigrams) and the record has tokens A B C D E F, embodiments would generate a vector, {"AB":1, "BC":1, "CD":1, "DE":1, "EF":1}. A vector with a window length of 3 would produce from the same record a vector, {"AB":1, "AC":1, "BC":1, "BD:1," "CD": 1, "CE": 1, . . . }. So one can see that higher window lengths produce more keys in the vector. This has the advantage of better matching vectors with higher confidence (e.g., having more similar cosine similarity measures) but on the other hand is computationally more expensive. Some embodiments start with the cheapest/smallest window length and move to higher lengths in a second pass if the first one does not produce sufficient confidence measures.

2. Clustering: Add the new vector into an existing cluster; make a new cluster with a previously unclassified vector; or add to the unclassified pile as a loose vector A. To add a vector to an existing cluster or to make a new cluster with a previous unclassified vector, in some embodiments, a cosine similarity measure between the two vectors exceeds a pre-configured threshold. For example, in some embodiments, a threshold of 0.8 is used. However, it should be appreciated that other thresholds may be used in other embodiments.

B. Book keeping for summarization and auto-faceting step:

i. As new vectors are added to a cluster, embodiments parse out tokens in the newly added vector and update a dictionary with each token as a key and the value being the total number of tokens embodiments have seen in that cluster so far. Illustratively, for an unclassified record, "Machine Foo called Bar", embodiments would have {"Machine": 1, "Foo": 1, "called":1, "Bar": 1}. If, for example, the next line was, "Machine Baz called Jaz", the dictionary would be updated to, {"Machine":2, "Foo": 1, "called":2, "Bar": 1, "Baz": 1, "Jaz":1} by enumerating the keys, embodiments would guess that Machine and called are 'Anchor' tokens (because they were represented in all records of this cluster) and the rest were 'variable' tokens they were not seen in all records. Embodiments then update a blueprint of the cluster as "Machine * called *". Specifically, the anchors are retained and other tokens are replaced with a wildcard or variable indicator, such as in the illustrated examples, an asterisk. However, other embodiments may use different wildcard symbols or wild card interface elements. In the example above, if the second record was, "Machine Foo called Jaz", embodiments would formulate a blueprint "Machine Foo called *", but that would get rectified when embodiments saw the first record that had a token other than Foo as the source machine. Some embodiments will begin by treating all tokens as anchors and then promoting them to variables as diversity is identified. When doing this embodiments create a new list associated with that '*' and add the old and new variable value to that list. This is used to generate the facet counts later from the dictionary.

3. Summarization and auto-faceting: Take a given cluster and generate facets on variable tokens across records in the cluster. This basically spits out the auto-facets computed in 2.B Differentiating two groups of clusters (each from a different window) may be implemented as follows:

1. Compare the centroid of each cluster of a given window with clusters in the other window and pair the ones that meet the cosine similarity threshold and have the highest match. Note that a new centroid is computed for each cluster when a new member is added.

A. Union the auto-facet counts for each paired cluster.

2. Take the cluster pairs from the preceding step and use chi-square goodness of fit measure to determine if the cluster has grown vs shrunk 'significantly' from the first window to the next. This step will label the pairs as 'same', 'grown' or 'shrunk'. Significance may be based on a predetermined threshold value.

A. Do analysis on the record count as well as facet counts.

3. Classify the remaining unpaired cluster or unclassified records as unique to their windows. For example, such records may be labeled as 'window 1 only' or 'window 2 only'.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
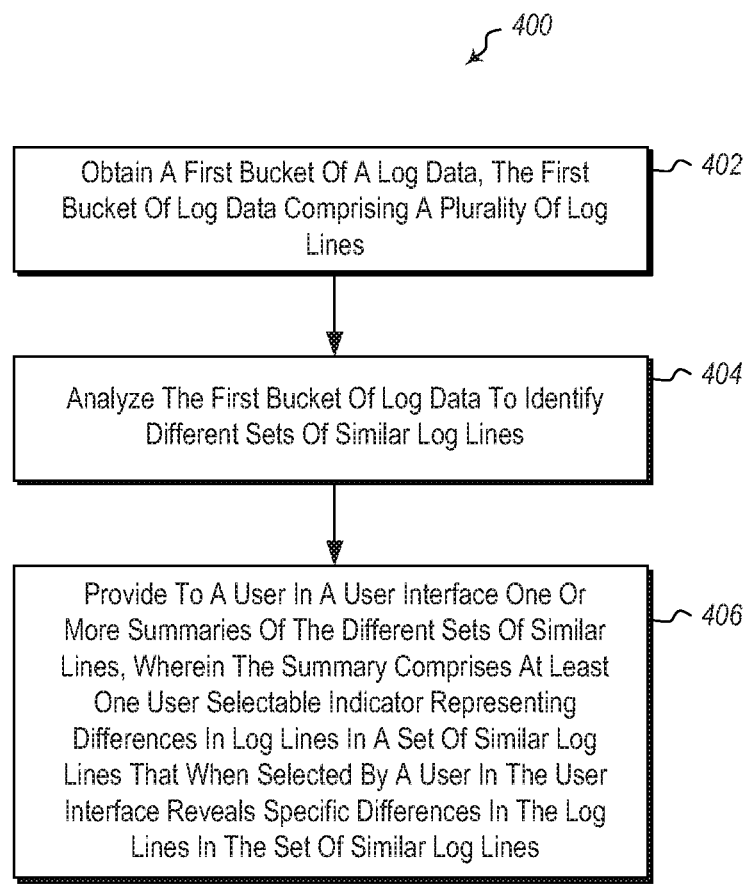
FIG. 4 illustrates a method of analyzing log data.

Referring now to FIG. 4, a method 400 is illustrated. The method 400 may be practiced in a computing environment, and includes acts for analyzing log data. The method includes obtaining a first bucket of a log data, the first bucket of log data comprising a plurality of log lines (act 402).

The method 400 further includes analyzing the first bucket of log data to identify different sets of similar (including identical) log lines (act 404).

The method 400 further includes providing to a user in a user interface one or more summaries of the different sets of similar lines, wherein the summary comprises at least one user selectable indicator representing differences in log lines in a set of similar log lines that when selected by a user in the user interface reveals specific differences in the log lines in the set of similar log line (act 406). For example, FIG. 1D illustrates an example where a user interface element 104 can be selected to show the differences in the log lines. For example, as illustrated in FIG. 1E, once a user selects the user interface element 104, then the differences in the log lines are shown.

The method 400 may be practiced where the one or more summaries comprise one or more templates showing how the members of each set are similar.

In such embodiments, the method 400 may further include providing user interface elements to show differences in the members for each of the sets (* notation in the example illustrated above).

The method 400 may further include displaying a distribution of the differences between the members of the set.

As illustrated previously, buckets of log data may be compared to each other. For example, in some embodiments, the method 400 further includes: obtaining a second bucket of log data; analyzing the log data in the second bucket to identify sets of similar log lines; and providing a comparison, to the user, of the sets from the first bucket to the sets from the second bucket. Examples of this are illustrated in FIGS. 2 and 3.

Such embodiments of the method 400 may be practiced where the first bucket and second bucket are selected based on a time dimension. For example, the time dimension may be based on a sliding window, preset selected times, times that are offsets of each other, etc.

Alternatively or additionally, the first bucket and second bucket are selected based on a machine dimension. Thus, for example, rather than logs being collected from the same machine at different times, the log lines can be collected from different machines.

Alternatively or additionally, the first bucket and second bucket are selected based on a transaction dimension. Thus for example, log lines from one transaction instance can be compared to log lines of another transaction instance.

Alternatively or additionally, the first bucket and second bucket are selected based on a user dimension. Thus, for example, log lines generated as a result of one user using a system can be compared to log lines generated for a different user using the system (or a different system).

Alternatively or additionally, the first bucket and second bucket are selected based on one or more other dimensions.

Embodiments may additionally include highlighting for the user comparisons of particular interest. For example, embodiments can illustrate to a user when a set has shrunk, grown, remained static, is only found in a first bucket, is only found in a second bucket, when sets have a uniform distribution, when sets have a sporadic distribution, etc.

The method 400 may further include selecting the first bucket based on results from a previous execution of the method. Thus, for example, a difference or anomaly may be discovered in a previous execution of the method. A user may wish to then only collect log lines (or especially collect log lines) with a particular characteristic. Thus, for example, the bucket may be required to have a particular URL, for example, to be considered. Similarly, embodiments may allow a user to specify particular characteristics of log lines to be analyzed using the illustrated method.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon instructions that are executable by the one or more processors to configure the computer system to analyze log data, including instructions that are executable to configure the computer system to perform at least the following:
      obtain a first bucket of a log data, the first bucket of log data comprising a plurality of log lines;
      analyze the first bucket of log data to identify a first plurality of different sets of similar log lines, wherein identifying the first plurality of different sets comprises grouping log lines into different sets based on a similarity of log lines in a given set;
      obtain a second bucket of log data;
      analyze the log data in the second bucket to identify a second plurality of different sets of similar log lines;
      cause a user interface to provide a comparison, to the user, of the first plurality of different sets from the first bucket to the second plurality of different sets from the second bucket including at least one graphical indication that indicates: which sets occur in both the buckets, which sets occur in only one of the buckets, or changes in the size of sets between buckets, wherein a size for a given set defines the number of log lines in the given set.

2. The system of claim 1, wherein one or more computer-readable media further have stored thereon instructions that are executable by the one or more processors to configure the computer system to show in the user interface one or more abbreviated summaries of different sets of similar lines, wherein the one or more abbreviated summaries comprise one or more templates showing how the members of each set are similar.

3. The system of claim 1, wherein one or more computer-readable media further have stored thereon instructions that are executable by the one or more processors to configure the computer system to display a distribution of differences between members of a given set of similar log lines.

4. The system of claim 1, wherein the first bucket and second bucket are selected based on a time dimension.

5. The system of claim 1, wherein the first bucket and second bucket are selected based on a machine dimension.

6. The system of claim 1, wherein the first bucket and second bucket are selected based on a transaction dimension.

7. The system of claim 1, wherein the first bucket and second bucket are selected based on a user dimension.

8. The system of claim 4, wherein log lines in the first bucket are collected from a first time in a sliding window and log lines in the second bucket are collected from a second time in a sliding window.

9. The computing system of claim 1, wherein each set of log lines in the first and second plurality of different sets of similar log lines is represented as a shaded element, wherein shading for each set of log lines in the first and second plurality of different sets of similar log lines is selected from a shading scheme that includes shades indicating that a set occurs in both buckets, that a set shrunk from the first bucket to the second bucket, that a set only occurs in the first bucket, that a set grew from the first bucket to the second bucket, and that a set only occurs in the second bucket.

10. The computing system of claim 1, wherein each set of log lines in the first and second plurality of different sets of similar log lines is represented over time to show a distribution of instances in a set over time.

11. In a computing environment, a method of analyzing log data, the method comprising:
    obtaining a first bucket of a log data, the first bucket of log data comprising a plurality of log lines;
       analyzing the first bucket of log data to identify a first plurality of different sets of similar log lines, wherein identifying the first plurality of different sets comprises grouping log lines into different sets based on a similarity of log lines in a given set;
    obtain a second bucket of log data;
       analyze the log data in the second bucket to identify a second plurality of different sets of similar log lines;
    cause a user interface to provide a comparison, to the user, of the first plurality of different sets from the first bucket to the second plurality of different sets from the second bucket including at least one graphical indication that indicates: which sets occur in both the buckets, which sets occur in only one of the buckets, or changes in the size of sets between buckets, wherein a size for a given set defines the number of log lines in the given set.

12. The method of claim 11, further comprising showing in the user interface one or more abbreviated summaries of different sets of similar lines, wherein the one or more abbreviated summaries comprise one or more templates showing how the members of each set are similar.

13. The method of claim 11, further comprising displaying a distribution of differences between members of a given set of similar log lines.

14. The method of claim 11, wherein the first bucket and second bucket are selected based on a time dimension.

15. The method of claim 11, wherein the first bucket and second bucket are selected based on a machine dimension.

16. The method of claim 11, wherein the first bucket and second bucket are selected based on a transaction dimension.

17. The method of claim 11, wherein the first bucket and second bucket are selected based on a user dimension.

18. The method of claim 14, wherein log lines are collected for the first bucket at a first time and log lines are collected for the second bucket at a predetermined offset from the first time.

19. A computing system comprising:
    one or more processors;
    a user interface, wherein the user interface is configured to:
       obtain a first bucket of a log data, the first bucket of log data comprising a plurality of log lines;
       analyze the first bucket of log data to identify a first plurality of different sets of similar log lines, wherein identifying the first plurality of different sets comprises grouping log lines into different sets based on a similarity of log lines in a given set; and
       obtain a second bucket of log data;

analyze the log data in the second bucket to identify a second plurality of different sets of similar log lines;

cause a user interface to provide a comparison, to the user, of the first plurality of different sets from the first bucket to the second plurality of different sets from the second bucket including at least one graphical indication that indicates: which sets occur in both the buckets, which sets occur in only one of the buckets, or changes in the size of sets between buckets, wherein a size for a given set defines the number of log lines in the given set.

20. The computing system of claim 19, wherein the first bucket and second bucket are selected based on a time dimension.

21. The computing system of claim 19, wherein the first bucket and second bucket are selected based on a machine dimension.

22. The computing system of claim 20, wherein log lines in the first bucket are collected from a first time in a sliding window and log lines in the second bucket are collected from a second time in a sliding window.

* * * * *